(12) United States Patent
Cooper (10) Patent No.: US 8,903,173 B2
(45) Date of Patent: Dec. 2, 2014

(54) AUTOMATIC IMAGE PROCESSING FOR DOCUMENT DE-SKEWING AND CROPPING

(75) Inventor: Jeffrey S. Cooper, Kitchener (CA)

(73) Assignee: NCR Corporation, Duluth, GA (US)

( * ) Notice: Subject to any disclaimer, the term of this patent is extended or adjusted under 35 U.S.C. 154(b) by 424 days.

(21) Appl. No.: 13/332,559

(22) Filed: Dec. 21, 2011

(65) Prior Publication Data

US 2013/0163846 A1 Jun. 27, 2013

(51) Int. Cl.
*G06K 9/34* (2006.01)

(52) U.S. Cl.
USPC ............ 382/177; 382/173; 382/277; 345/156

(58) Field of Classification Search
CPC ............ G06K 9/00; G06K 9/32; G09G 5/00; H04N 1/3878; H04N 1/3877
USPC ......... 382/137–140, 173, 174, 175, 177, 180, 382/229, 276, 302, 309; 345/156, 173; 358/1, 18, 1.9, 474, 498, 538
See application file for complete search history.

(56) References Cited

U.S. PATENT DOCUMENTS

| | | | | |
|---|---|---|---|---|
| 5,274,567 A * | 12/1993 | Kallin et al. | | 700/213 |
| 5,680,472 A * | 10/1997 | Conant | | 382/135 |
| 5,717,794 A * | 2/1998 | Koga et al. | | 382/309 |
| 5,832,100 A * | 11/1998 | Lawton et al. | | 382/100 |
| 6,078,683 A * | 6/2000 | Denison et al. | | 382/135 |
| 6,097,834 A * | 8/2000 | Krouse et al. | | 382/137 |
| 6,234,294 B1 * | 5/2001 | Defeo et al. | | 194/207 |
| 6,282,326 B1 * | 8/2001 | Lee et al. | | 382/289 |
| 6,556,701 B1 * | 4/2003 | Chiba et al. | | 382/137 |
| 7,231,082 B2 * | 6/2007 | Lenoir | | 382/154 |
| 7,837,096 B2 * | 11/2010 | Beskitt et al. | | 235/379 |
| 8,204,293 B2 * | 6/2012 | Csulits et al. | | 382/135 |
| 8,264,502 B2 * | 9/2012 | Wang et al. | | 345/619 |
| 8,391,609 B2 * | 3/2013 | Huntington et al. | | 382/194 |
| 8,478,020 B1 * | 7/2013 | Jones et al. | | 382/137 |
| 8,517,260 B1 * | 8/2013 | Brown et al. | | 235/379 |
| 8,587,613 B2 * | 11/2013 | Wang et al. | | 345/619 |
| 2001/0014183 A1 * | 8/2001 | Sansom-Wai et al. | | 382/289 |
| 2002/0044677 A1 * | 4/2002 | Fox | | 382/135 |
| 2003/0053681 A1 * | 3/2003 | Jia | | 382/154 |
| 2004/0027350 A1 * | 2/2004 | Kincaid et al. | | 345/440 |
| 2004/0109192 A1 * | 6/2004 | Nuttall et al. | | 358/1.14 |
| 2004/0143621 A1 * | 7/2004 | Fredrickson et al. | | 709/200 |
| 2005/0076295 A1 * | 4/2005 | Simske et al. | | 715/517 |
| 2005/0281483 A1 * | 12/2005 | Teng | | 382/289 |
| 2006/0232618 A1 * | 10/2006 | Maetani et al. | | 347/2 |
| 2008/0267502 A1 * | 10/2008 | Youngers et al. | | 382/176 |
| 2008/0285792 A1 * | 11/2008 | Comay | | 382/100 |
| 2009/0179737 A1 * | 7/2009 | Ashby et al. | | 340/5.86 |
| 2009/0245678 A1 * | 10/2009 | Ming | | 382/257 |
| 2009/0324053 A1 * | 12/2009 | Ross et al. | | 382/137 |
| 2010/0195933 A1 * | 8/2010 | Nafarieh | | 382/289 |
| 2011/0043864 A1 * | 2/2011 | Tian et al. | | 358/3.26 |
| 2012/0263370 A1 * | 10/2012 | Ashby et al. | | 382/135 |

* cited by examiner

*Primary Examiner* — Chan Park
*Assistant Examiner* — Mia M Thomas
(74) *Attorney, Agent, or Firm* — Joseph P. Merhle (57) ABSTRACT

An image of a rectangular target is resolved. First and second dimensions for the rectangular target are determined from an initial image. A cropped and de-skewed final image for the rectangular target is produced responsive to the first and second dimensions.

8 Claims, 4 Drawing Sheets

AUTOMATIC IMAGE PROCESSING FOR DOCUMENT DE-SKEWING AND CROPPING

FIELD OF THE INVENTION

The present invention relates to a method and apparatus for providing an image of a rectangular target object. In particular, but not exclusively, the present invention relates to the provision of an image of a check of the type associated with a financial transaction. The image is automatically de-skewed and cropped for exchange between financial institutions.

BACKGROUND TO THE INVENTION

From time to time it is known that users wish to obtain electronic images of real life target objects. Many such target objects have a rectangular, including square, shape. In order to provide an electronic image, an image capturing device such as a flatbed scanner or camera are utilized to provide digital image data responsive to the appearance of the target object. Because of alignment problems, it is known that the images of target objects can be over or under sized and can also include an element of skew. When an image is to be transmitted from one location to another, it is often advantageous to have the image fitted to a standardized size and shape. This includes cropping the image to adjust the image to a pre-determined threshold size. This also includes de-skewing whereby an image set at an angle with respect to a viewing display is tilted to be more closely aligned with a desired orientation. Various techniques are known for carrying out the de-skewing and cropping processes.

A particular situation where the provision of an electronic image in a suitable cropped and de-skewed format is required is in the technical field of financial checking. In some countries, for example in the USA, an image of a check is considered a negotiable instrument. Processes have therefore been introduced to carry out an image capture process whereby digital images of the checks for subsequent exchange between financial institutions are provided.

Prior known techniques include a flatbed scanner application in which a user locates a rectangular check on a flatbed scanner and then scans the document. Electronic image data is produced which is utilized to display an electronic image on a user display. In order to crop and de-skew the image, it is known to provide a rectangular box around the image on a user display. A user then rotates this box as a separate step. Often rotating the image to de-skew requires re-adjusting a bounding box size and/or shape and this makes the current state of the art error prone, time consuming and difficult for non-trained people to carry out.

Indeed, even an expert user can take tens of seconds to get a selection sized and aligned and ensure that the alignment process has been carried out accurately. This is a barrier to use for many document scanning applications, including, but not limited to, scanning of negotiable checking documents.

SUMMARY OF THE INVENTION

It is an aim of the present invention to at least partly mitigate the above-mentioned problems.

It is an aim of certain embodiments of the present invention to provide a method and apparatus for providing an image of a rectangular target object in which a cropped and de-skewed final image of the target object is provided.

It is an aim of certain embodiments of the present invention to provide a duly cropped and de-skewed final image of a rectangular object via a technique which is simple for a user to carry out and does not require detailed training.

It is an aim of certain embodiments of the present invention to provide a method and apparatus for providing a cropped and de-skewed final image of a target object such as a financial check which can be generated without error and subsequently utilized as part of a financial transaction.

According to a first aspect of the present invention, there is provided a method for providing an image of a rectangular target object, comprising the steps of:

Determining only a first dimension of a rectangular target object in an initial image;

Subsequently determining only a second dimension of the target object;

and

Subsequently providing a cropped and de-skewed final image of the target object responsive to the determined first and second dimension.

Aptly, the method further includes the step of determining a rectangular bounding box and de-skew angle associated with a target object substantially simultaneously.

Aptly, the method step of determining the first dimension comprises displaying a scanned image of the target object on a user display on a user interface;

via the user interface, providing a user with an option to select a first and adjacent corner point of the target object in the initial image; and subsequently determining a line between the first and adjacent corner points, a length of said line indicating the first dimension.

Aptly, the method further includes subsequent to selection of the first corner point, as a user moves an indicator over the displayed image, displaying a visual cue comprising a line displayed on the user display between the first corner point and a position of the indicator.

Aptly, the step of determining the second dimension comprises, via the user interface, providing the user with an option to move an indicator on the user display away from the adjacent corner point and determining a perpendicular distance from a final position of the indicator selected by the user to a line passing through the first and adjacent corner point, said perpendicular distance comprising said second dimension.

Aptly, the method further includes, as the user locates said an indicator over the displayed image subsequent to selection of the adjacent corner point, displaying a visual cue comprising a rectangle outline on the user display, a first and further corner of the outline matching a respective location of the first and adjacent corner point.

Aptly, the method further includes determining a de-skew angle θ according to $$\theta = \tan^{-1}\left(\frac{\Delta y}{\Delta x}\right) = \tan^{-1}\left(\frac{y_1 - y_0}{x_1 - x_0}\right)$$

where $y_1$ (y subscript 1) is a y co-ordinate at the first corner point, $y_0$ (y subscript 0) is a y co-ordinate at an adjacent corner point, $x_1$ (x subscript 1) is an x co-ordinate at the first corner point and $x_0$ (x subscript 0) is an x co-ordinate at the adjacent corner point.

Aptly, the method step of determining the second dimension comprises determining h according to $$h = \frac{|a \times b|}{|a|} = \frac{x_2(y_1 - y_0) + y_2(x_1 - x_0) + x_0 y_1 - x_1 y_0}{\sqrt{(x_1 - x_0)^2 + (y_1 - y_0)^2}}$$

where $x_2$ (x subscript 2) is an x co-ordinate at the final position, $x_1$ (x subscript 1) is an x co-ordinate at a first corner point, $x_0$ (x subscript 0) is an x co-ordinate at an adjacent corner point, $y_2$ (y subscript 2) is a y co-ordinate at the final position, $y_1$ (y subscript 1) is a y co-ordinate at a first corner point and $y_0$ (y subscript 0) is a y co-ordinate at the adjacent corner point.

Aptly, the method includes the steps of scanning a check on a flatbed scanner thereby providing scanned image data; and displaying the scanned image responsive to the scanned image data.

Aptly, the method further includes the steps of selecting the first and adjacent corner points by a user touching a touch screen display displaying the initial image where a first and adjacent corner of the target object are displayed or by a user moving a computer mouse to locate a cursor displayed on the user display displaying the initial image where the first and adjacent corner of the target object are displayed.

According to a second aspect of the present invention, there is provided a method of exchanging a negotiable instrument between a first and further financial institution, comprising the method as claimed in claim 1, wherein the target object is a check and the method further comprises the steps of encoding the provided image to provide encoded data and transmitting the encoded data from a first to a further financial institution.

According to a third aspect of the present invention, there is provided a product which comprises a computer program comprising program instructions for providing an image of a rectangular target object, comprising the steps of:

determining only a first dimension of a rectangular target object in an initial image;

subsequently determining only a second dimension of the target object; and subsequently providing a cropped and de-skewed final image of the target object responsive to the determined first and second dimension.

According to a fourth aspect of the present invention, there is provided apparatus for providing an image of a rectangular target object, comprising:

a user interface comprising a user display and at least one user response device for selecting a desired location on the user display;

a processor that determines only a first dimension of a rectangular target object in an initial image, subsequently determines only a second dimension of the target object, and subsequently displays a cropped and de-skewed final image of the target object on the user display responsive to the first and second dimension.

Aptly, the apparatus processor determines a first dimension of the target object by determining a distance between a first and adjacent corner point selected by a user and determines a second dimension of the target by determining a distance h where $$h = \frac{|a \times b|}{|a|} = \frac{x_2(y_1 - y_0) + y_2(x_1 - x_0) + x_0 y_1 - x_1 y_0}{\sqrt{(x_1 - x_0)^2 + (y_1 - y_0)^2}}$$

where $x_2$ (x subscript 2) is an x co-ordinate at the final position, $x_1$ (x subscript 1) is an x co-ordinate at a first corner point, $x_0$ (x subscript 0) is an x co-ordinate at an adjacent corner point, $y_2$ (y subscript 2) is a y co-ordinate at the final position, $y_1$ (y subscript 1) is a y co-ordinate at a first corner point and $y_0$ (y subscript 0) is a y co-ordinate at the adjacent corner point.

Aptly, the processor determines a de-skew angle θ according to $$\theta = \tan^{-1}\left(\frac{\Delta y}{\Delta x}\right) = \tan^{-1}\left(\frac{y_1 - y_0}{x_1 - x_0}\right)$$

where y1 (y subscript 1) is a y co-ordinate at the first corner point, $y_0$ (y subscript 0) is a y co-ordinate at an adjacent corner point, $x_1$ (x subscript 1) is an x co-ordinate at the first corner point and $x_0$ (x subscript 0) is an x co-ordinate at the adjacent corner point.

According to a fifth aspect of the present invention there is provided a method of providing an image, comprising:

providing a cropped and de-skewed sub-image from a primary image comprising an image of a rectangular target object subsequent to only the selection of three positions of the primary image.

Certain embodiments of the present invention provide a method and apparatus for providing a cropped and de-skewed final image of a rectangular target object such as a financial check via a technique which is substantially error proof and easy to use.

Certain embodiments of the present invention provide a method whereby a user can utilize a mouse or touch screen user display with only a few steps to produce a cropped and de-skewed image of a desired target object.

Certain embodiments of the present invention provide an approach which is quick to use, easy to use and accurate. Also, the technique is well suited to touch interfaces and mouse interfaces alike.

Certain embodiments of the present invention provide an interface for a user wishing to produce cropped and de-skewed final images of a rectangular target object which is intuitive and which provides better feedback to a user allowing them to learn the technique through a quick trial and error approach without a need to consult with documentation or instructions. The simplified learning results in a superior user experience.

BRIEF DESCRIPTION OF DRAWINGS

Embodiments of the present invention will now be described hereinafter, by way of example only, with reference to the accompanying drawings in which.

DESCRIPTION OF EMBODIMENTS

In the drawings like reference numerals refer to like parts.

Figure 1:
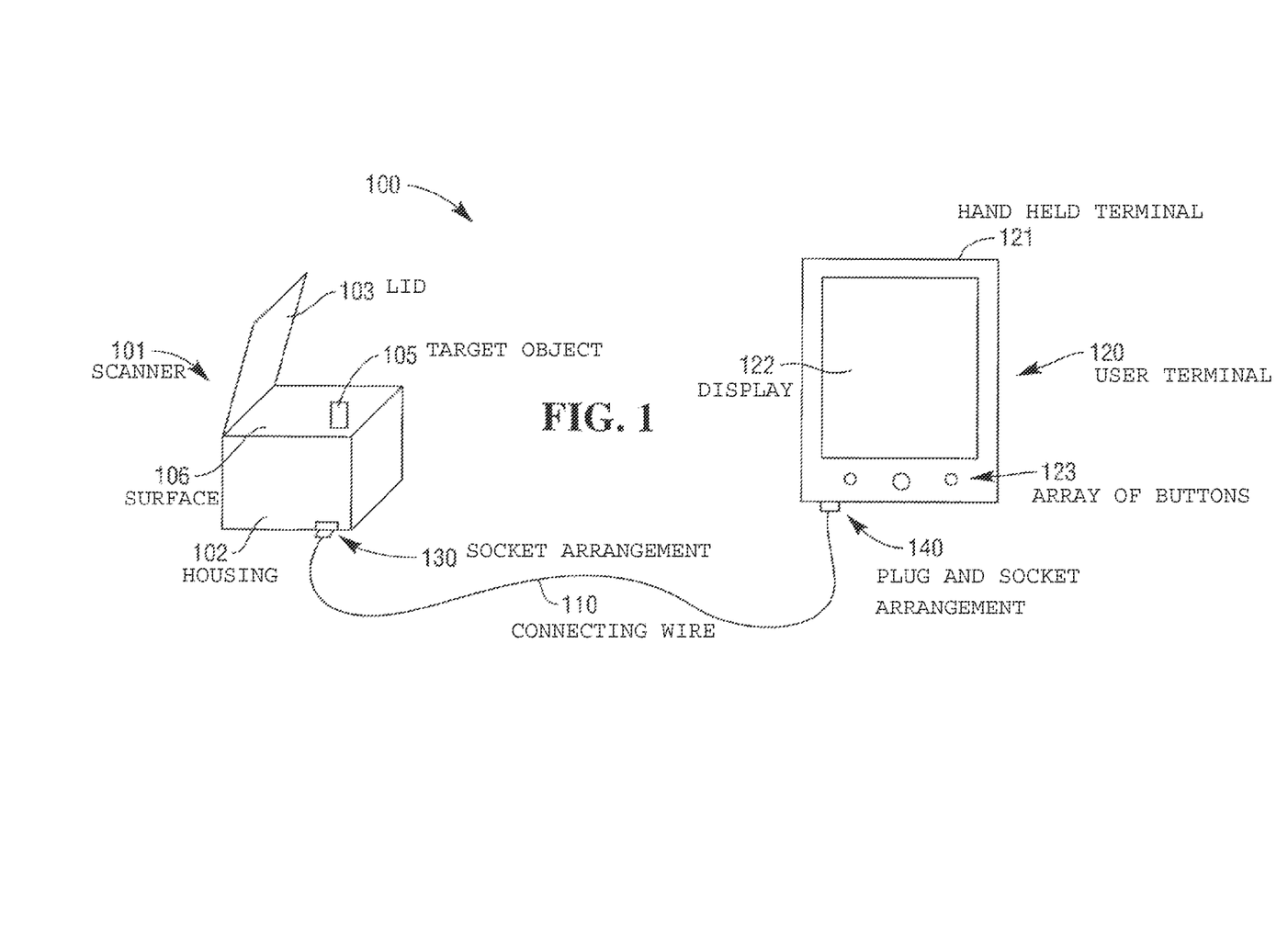
FIG. 1 illustrates a scanner and user interface system according to an embodiment of the present invention.

FIG. 1 illustrates apparatus 100 utilized for providing an image of a rectangular target object. As shown in FIG. 1, a flatbed scanner 101 includes a substantially cube-like housing 102 with a pivotable lid 103 which is closed when a target object 105 is duly located on a flat scanning surface 106. As will be understood by those skilled in the art, when a target object is located on the scanning surface and the lid 103 closed, a subsequent scanning operation takes place in which a scanning head moves across the flat scanning surface generating image data responsive to the features of the target object located on the scanning surface. This image data is transmitted through a connecting wire 110 to a user terminal 120. The user terminal 120 shown in FIG. 1 is a hand-held mobile terminal 121 which includes a touch screen user display 122 and an array 123 of user buttons. The connecting wire 110 is connected to the flatbed scanner 101 via a plug and socket arrangement 130 and the connecting wire 110 is connected to the user terminal 120 via an appropriate plug and socket arrangement 140.

It will be appreciated that certain embodiments of the present invention provide an apparatus and method for providing a desired image of a rectangular target object. For example, but not exclusively, certain embodiments of the present invention can be utilized to provide images of personal checks. That is to say, checks of the type utilized by people or businesses for transferring money from one account to another. In this sense it will be understood that a check is a financial instrument which can be negotiated. Other target objects which have a rectangular (including square) shape can be imaged according to certain embodiments of the present invention. These are not limited to target objects associated with a financial transaction.

It will also be understood that whilst certain embodiments of the present invention are described hereinafter by way of generating image data with a flatbed scanner, other image generating techniques can be utilized. For example, a rectangular target object may be located on a surface and then scanned with a hand-held scanner. Alternatively, a digital camera may be utilized to capture image data of a target object. Still further techniques are of course possible. A front and back image of the target object is captured using two separate steps whereby a first side of the target object is first scanned and thus imaged, and subsequently a reverse side of the target object is scanned to thereby provide a second image.

It will also be appreciated that whilst certain embodiments of the present invention are described whereby a hard wired connection is provided between the scanning mechanism and a user terminal, other connectivities can of course be utilized. For example, a connection across which data can be transferred, may be a wireless communication link such as those associated with the Bluetooth or Zigbee or the like connection standards.

Whilst the embodiment shown in FIG. 1 utilizes a mobile terminal such as a smart phone, iPhone, iPad, tablet or the like, it will be appreciated that certain embodiments of the present invention can be utilized whereby the user terminal is a fixed terminal such as a PC or other processing element or the like.

Subsequent to a side of the target object being scanned or optionally subsequent to both sides of the target object being scanned one-by-one, data is transmitted from the scanning device to the user terminal over the connection.

The image data transmitted is utilized by a processor in the user terminal and thereafter an image of a first side of the target object is displayed on the user display. It will be appreciated that certain embodiments of the present invention may carry out this process on an ad hoc basis whenever a connection is made between a scanning device or by other suitable timing mechanisms. For example, when an associated app is launched on the mobile terminal.

Figure 2:
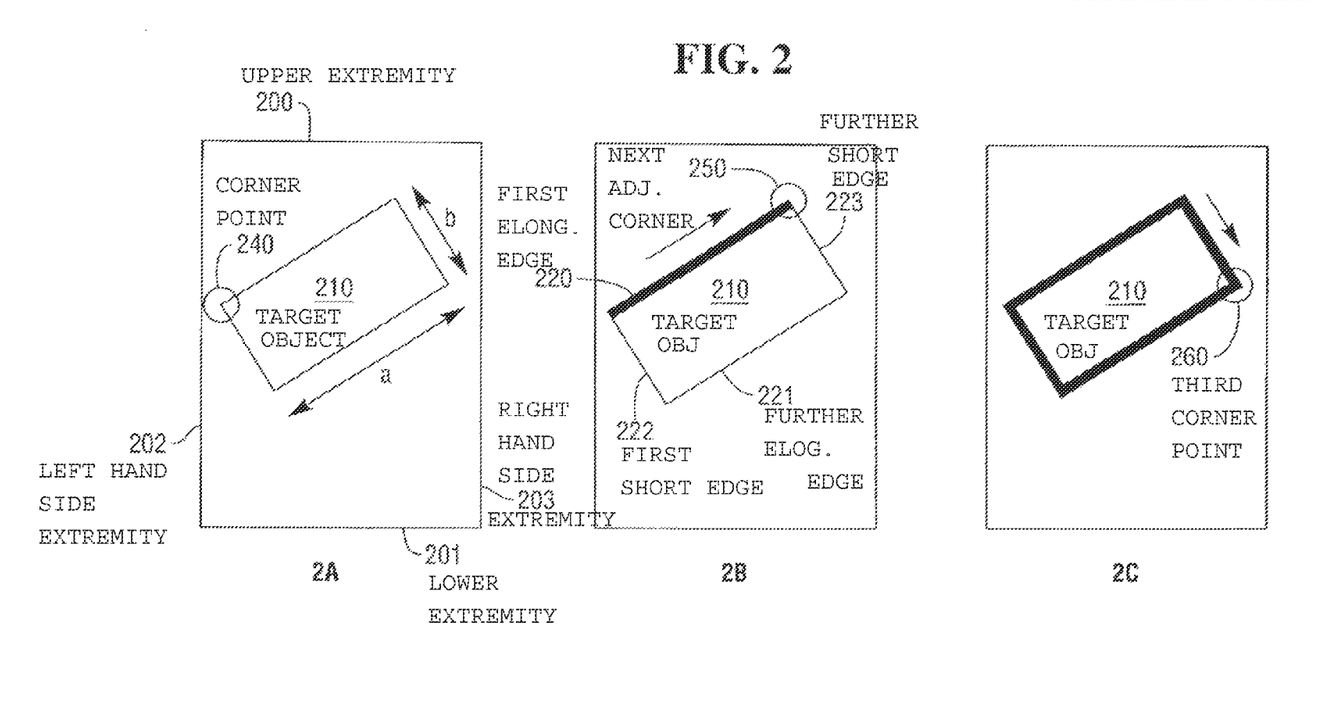
FIG. 2 illustrates selection of an adjacent corner point which enables a dimension to be established.

FIG. 2 illustrates how an image of a target object is displayed on the user display 122. The whole image on the user display is substantially rectangular having an upper extremity 200 and a lower extremity 201 which is substantially parallel with and spaced apart from the upper extremity. A left hand side extremity 202 is likewise substantially parallel with and spaced apart from a right hand side extremity 203. The image of a target object 210 is displayed in a central region of the user display 122. The image of the target object has a length a which is associated with a width of the target object. The width is thus the length of the longest side of the target object. The image of the target object also has a height b which is associated with the shorter edge of the target object 105.

As illustrated in FIG. 2, because of user inaccuracy when the target object 105 is located on the scanning surface 106 of the flatbed scanner 101, the displayed image 210 is skewed with respect to the display screen 122. That is to say, the image of the target object is substantially rectangular and the edges of the rectangle are not substantially parallel with the upper and lower extremities and left and right hand side extremities on the display screen. As illustrated more clearly in FIG. 2b, the image of the target object has a first elongate edge 220 and a further elongate 221 which is substantially parallel with and spaced apart from the first elongate edge. The image of the rectangular target object also has a first short edge 222 and a further short edge 223 which is substantially parallel with and spaced apart from the first short edge.

It is desirable and, in some cases necessary, for an image of the target object to fulfill certain pre-determined criteria. That is to say, the cross-sectional area of the target object in an image should be sized to have a pre-determined size and shape. Also, the subsequent image should be de-skewed. That is to say, an angle by which an image of the target object is offset with respect to a pre-determined co-ordinate system is eliminated. To this effect, subsequent to display of the image of the target object on the user display 122, a user makes certain limited selections to indicate important regions of the displayed image which thereafter enable a processor to determine the effective image area (that is to say, the dimensions of the sides of the area of the image of the target object in the whole of the display area) and a de-skew angle associated with the displayed image of the rectangular target object with respect to the user display.

The method by which a user indicates the key regions of the target object is explained in further detail hereinbelow with reference to FIGS. 2, 3, 4 and 5. As shown in FIG. 2, a user is first prompted to select a first corner 240 of the image of the rectangular target object. In the case of a hand-held mobile terminal, this may be selected by a user touching a touch screen at a corner point of the image, or by a user otherwise locating an indicator device such as a touch pen onto a touch screen. Subsequent to selection of a first corner, a user then identifies a next adjacent corner 250. This may likewise be selected by a user touching a touch screen at a corner of the displayed image or by locating a pen on the touch screen at the corner point. Whilst in FIG. 2b the further corner point is selected as the corner point spaced apart from the first selected corner point by a longest edge 220 of the image, it will be appreciated that a second adjacent corner point selected could be a corner point spaced apart from the first corner point by the short edge 222. The second selected corner point is however an adjacent corner point, by which is meant it is not a corner point spaced apart on a diagonal from the first selected corner point.

By selecting a first and subsequently second adjacent corner, a user has input user data which a processor can utilize to calculate a first dimension of the rectangular target object (in FIGS. 2a and 2b this would be the width of a long edge 220) but also has provided sufficient data for a skew angle θ to be calculated. This is described in more detail hereinbelow.

Subsequent to the selection of a first and further adjacent corner of the image of the rectangular target object, a third corner of the rectangular angular object is to be determined. This is achieved in one of three possible ways. A first way is illustrated in FIG. 2c whereby a user selects the location of a third corner point 260 which is adjacent to the second selected corner point 250 and diagonally opposed across the image of the rectangular target object from the first selected corner point 240. Again, selection of the third corner point 260 may be made by a user touching a touch screen at the appropriate region where the corner point is located or by locating a user pen or other such stylus implement at the location of the third corner.

Figure 3:
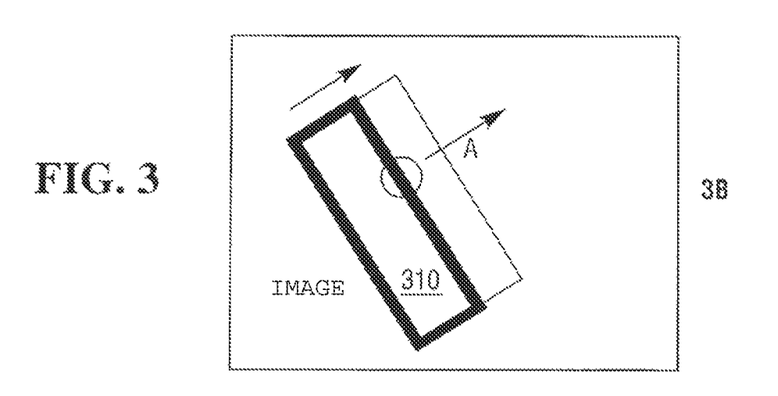
FIG. 3 illustrates alternative techniques for identifying/selection of a third corner.

FIG. 3 helps illustrate how the third corner point may be selected according to various techniques. Whichever technique is utilized, the processor in the user, terminal and associated software/hardware automatically determines the third corner point or at least a distance from the corner point to a line passing through the first and second selected corner points, regardless of any need for a user to select which technique is being utilized to determine the location of the third corner. In carrying out this step it is important to realize that when outlining the rectangle in the image, it is difficult for a person to move a line out perpendicular to (that is to say at 90° to) the second selected corner point. Therefore, as shown in FIG. 3a, an option for a user is merely to locate a finger or stylus or other such indicator outside of the displayed rectangle and drag this away from an imaginary or drawn line passing between the first and second selected corner points.

Figure 3A:
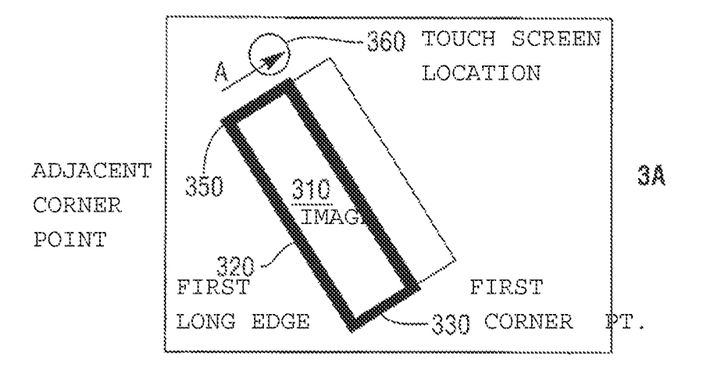

By way of explanation, FIG. 3a includes a skewed image of a rectangular target object. The image 310 has a first long edge 320 which is displayed on the user display. A user, following the steps illustrated in FIGS. 2a and 2b, selects a first and further corner point defining the extremities of this long edge. For example, a user selects a first corner point 330 and spaced apart adjacent corner point 350. This enables a line to be drawn between the first corner point 330 and the second selected corner point 350. Next instead of a user identifying the third corner point by carefully locating an indicator at that corner point, a user can draw their finger or a stylus across the touch-sensitive display screen at a location 360 adjacent to second corner point 350. This is illustrated by the arrow A in FIG. 3a. The user is thus not specifically identifying the third corner point but rather is identifying a distance associated with a height of the target object.

Figure 3C:
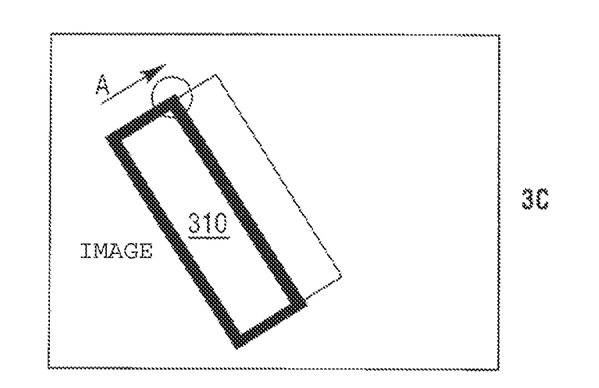

FIG. 3b helps illustrate an alternative technique whereby instead of a user running a finger or stylus away from the long edge 320 to one side of a short edge of the image, the finger or stylus or other such indicator may be moved away from the long edge 320 over the displayed image. That is to say, in the direction shown by arrow A in FIG. 3b. A user is thus not attempting to identify a third corner by pointing to it but rather is assisting in defining a height, that is to say, a length of the short edge, of the image of the target object. FIG. 3c illustrates an alternative method whereby a user moves a finger or stylus along the short edge of the rectangular target object image. It will be understood that if the user carries out this technique, then they will ultimately end up at the point associated with the third corner of the image of the rectangular target object. This is possible but in practice more difficult for a user to accurately achieve. Certain embodiments of the present invention are, however, usable in this manner.

The height of the image of the rectangular target object is calculated regardless of the position of an end point of a user indicating input. This is determined using a parallelogram technique. Regardless of side-to-side movement, a rectangle is drawn accurately and the fatigue of accurate positioning often associated with prior art techniques is removed.

Figure 4:
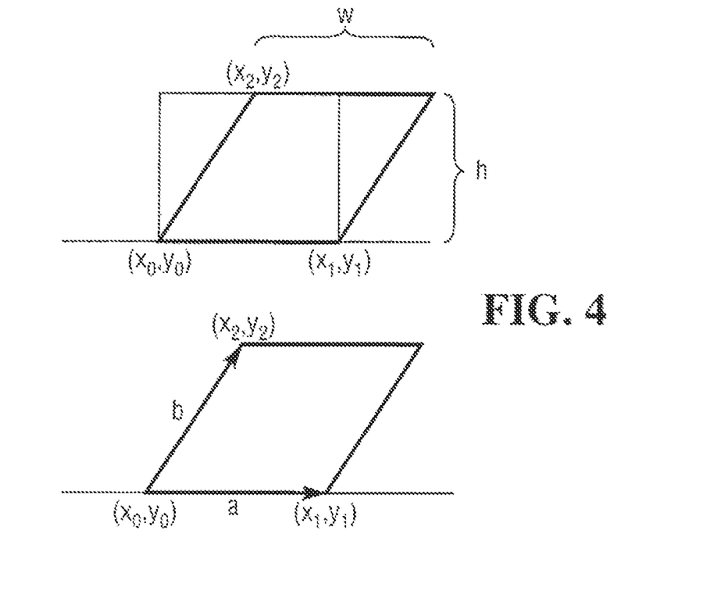
FIG. 4 illustrates determination of a second dimension of the target object.

FIG. 4 helps illustrate a parallelogram technique which is utilized to determine the height associated with the image of the rectangular target object. It will be appreciated that if a user inputs this height by selecting first and second corners associated with the short edge, then the third step and the parallelogram technique can be utilized alternatively to determine a width associated with the image of the rectangular target object. The height h is given by:

$$\text{Area} = \text{width} \cdot \text{height} \qquad 1.1$$

$$\text{height} = \frac{\text{Area}}{\text{width}}$$

$$\text{Area} = |a \times b|$$

$$\text{height} = \frac{|a \times b|}{|a|}$$

$$a = (x_1 - x_0, y_1 - y_0)$$

$$b = (x_2 - x_0, y_2 - y_0)$$

$$|a \times b| = \begin{vmatrix} (x_1 - x_0) & (x_2 - x_0) \\ (y_1 - y_0) & (y_2 - y_0) \end{vmatrix}$$

$$|a \times b| = (x_1 - x_0)(y_2 - y_0) - (y_1 - y_0)(x_2 - x_0)$$

$$|a \times b| = x_2(y_1 - y_0) + y_2(x_1 - x_0) + x_0 y_1 - x_1 y_0$$

$$|a| = \sqrt{(x_1 - x_0)^2 + (y_1 - y_0)^2}$$

$$h = \frac{|a \times b|}{|c|} = \frac{x_2(y_1 - y_0) + y_2(x_1 - x_0) + x_0 y_1 - x_1 y_0}{\sqrt{(x_1 - x_0)^2 + (y_1 - y_0)^2}}$$

Here a is a vector formed by the first line which begins at the co-ordinates $x_0, y_0$ and passes to the point defined by $x_1, y_1$. b is likewise a vector defined as the line between the point $(x_0, y_0)$ and the point defined by $(x_2, y_2)$. The second dimension is calculated using the cross product between the vectors a and b. That is to say, the length of the line between the first two points becomes a first dimension and a second dimension is calculated using the cross product between the vectors formed by the first line (as vector) and the vector from first point to third point.

Figure 5:
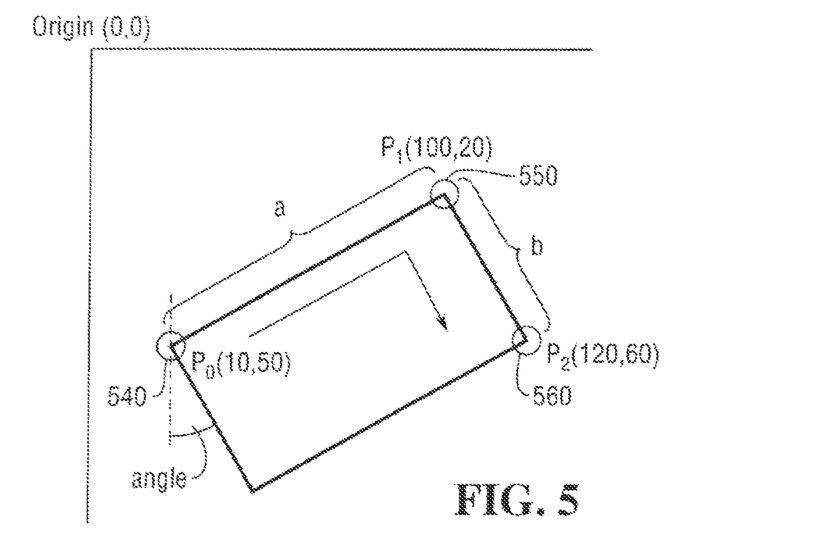
FIG. 5 illustrates display of a skewed rectangular object.

FIG. 5 helps illustrate the technique using a specific example in which a user first selects a first corner position 540 identified as P0, then identifies a second adjacent corner 550 associated with a point P1 and thereafter identifies a third corner point 560 associated with point P2. In this way, the height b may be calculated by:

$$a = (x_1 - x_0, y_1 - y_0) = (100 - 10, 20 - 50) = (90, -30)$$

$$b = (x_2 - x_0, y_2 - y_0) = (120 - 10, 60 - 50) = (110, 10)$$

$$|a| = \sqrt{(x_1 - x_0)^2 + (y_1 - y_0)^2}$$

$$|a| = \sqrt{(100 - 10)^2 + (20 - 50)^2}$$

$$|a| = 94.87$$

$$|b| = \frac{|a \times b|}{|a|}$$

$$|a \times b| = \begin{vmatrix} (x_1 - x_0) & (x_2 - x_0) \\ (y_1 - y_0) & (y_2 - y_0) \end{vmatrix}$$

$$|a \times b| = (x_1 - x_0)(y_2 - y_0) - (y_1 - y_0)(x_2 - x_0)$$

$$|a \times b| = (x_1 - x_0)(y_2 - y_0) - (y_1 - y_0)(x_2 - x_0)$$

$$|a \times b| = x_2(y_1 - y_0) + y_2(x_1 - x_0) + x_0 y_1 - x_1 y_0$$

$$|a \times b| = 120(20 - 50) + 60(100 - 10) + 10 \cdot 20 - 100 \cdot 50$$

$$|a \times b| = -3000$$

$$|b| = \frac{|a \times b|}{|a|} = \frac{-3000}{94.87} = -31.62$$

Here a negative value indicates a negative height, that is to say, moving away from the origin in a negative direction and a positive number indicates a positive height, that is to say, moving away from the origin in a positive direction.

The skew angle θ may be calculated according to:

$$\theta = \tan^{-1}\left(\frac{\Delta y}{\Delta x}\right) = \tan^{-1}\left(\frac{y_1 - y_0}{x_1 - x_0}\right) \quad 1.2$$

Whilst certain embodiments of the present invention have been described in which a user identifies positions of corners or distances utilizing a touch screen display or stylus, it will be appreciated that other techniques may be utilized for allowing a user to provide user input. For example, if the user terminal is a PC, a user may utilize a mouse to move an icon on a user display by locating the mouse so that the icon is moved to corner points and then moved to indicate a second dimension.

Certain embodiments of the present invention provide an approach which is quick, easy to use and accurate and which is well-suited to touch type interfaces and mouse interfaces alike. Certain embodiments of the present invention enable people who have had little or no training to be able to perform a task in less time than an expert would take with prior known techniques.

Certain embodiments of the present invention utilize a click or point to specific corners and this increases the accuracy of skew angle determination for a document. It is known that people have great difficulty comparing two lines and determining if they are parallel. Selecting the extent of one edge provides the highest resolution input possible and maximum accuracy for angle measurement. If a long edge of a document is optionally used, accuracy is further maximized. In fact, users will tend to utilize the long edge naturally because this feels easier.

Certain embodiments of the present invention enable the boundaries and skew angle of a rectangular document within a larger image to be determined and subsequently corrected.

Aptly, the invention combines drawing a rectangular bounding box with the identification of a rotation angle as a single step. A user selects any one corner of a document within a displayed image. Next, a user moves to a second corner along any adjacent edge of the document. Optionally, a rubber band line may be drawn on the user display along this path to assist in alignment with an edge. Next, a user selects a second corner position. Next, a user moves outwards towards an opposite edge and clicks or otherwise selects anywhere in line with the edge to identify the rectangular bounding region. Optionally, a banding rectangle may be drawn to outline to a selected portion and aid in identifying an extent of the displayed target object in the overall image. A first three of these steps identify the skew angle of the document. These first three steps also identify a length associated with an edge. The later steps identify a further length associated with a further edge of the document. Any edge may be utilized and certain embodiments of the present invention do not require a person to select edges in any order.

Aptly, it is sufficient for the user to directly touch any three corners without dragging or rubber banding. This approach is helpful when a touch-sensitive input device is utilized. Alternatively, it is sufficient for a user to directly touch only two corners on one edge and then select a third point on or aligned with an opposing edge. The third selected point may be a point on a line passing through the opposed edge.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for providing an image of a rectangular target object, comprising the steps of:

determining only a first dimension of a rectangular target object in an initial image, wherein the determining the first dimension further includes displaying a scanned image of the target object on a user display on a user interface, and via the user interface, providing a user with an option to select a first and adjacent corner point of the target object in the initial image; and subsequently determining a line between the first and adjacent corner points, a length of said line indicating the first dimension;

subsequently determining only a second dimension of the target object;

subsequently providing a cropped and de-skewed final image of the target object responsive to the determined first and second dimension; and determining a de-skew angle θ according to $$\theta = \tan^{-1}\left(\frac{\Delta y}{\Delta x}\right) = \tan^{-1}\left(\frac{y_1 - y_0}{x_1 - x_0}\right)$$

where $y_1$ is a y co-ordinate at the first corner point, $y_0$ is a y co-ordinate at an adjacent corner point, $x_1$ is an x co-ordinate at the first corner point and $x_0$ is an x co-ordinate at the adjacent corner point.

2. The method as claimed in claim 1, further comprising:
subsequent to selection of the first corner point, as a user moves an indicator over the displayed image, displaying a visual cue comprising a line displayed on the user display between the first corner point and a position of the indicator.

3. The method as claimed in claim 1 wherein the step of determining the second dimension comprises:
via the user interface, providing the user with an option to move an indicator on the user display away from the adjacent corner point and determining a perpendicular distance from a final position of the indicator selected by the user to a line passing through the first and adjacent corner point, said perpendicular distance comprising said second dimension.

4. The method as claimed in claim 1, further comprising:
scanning a check on a flatbed scanner thereby providing scanned image data; and
displaying the scanned image responsive to the scanned image data.

5. The method as claimed in claim 1, further comprising:
selecting the first and adjacent corner points by a user touching a touch screen display displaying the initial image where a first and adjacent corner of the target object are displayed or by a user moving a computer mouse to locate a cursor displayed on the user display displaying the initial image where the first and adjacent corner of the target object are displayed.

6. A method for providing an image of a rectangular target object, comprising the steps of:
determining only a first dimension of a rectangular target object in an initial image, wherein the determining the first dimension further includes displaying a scanned image of the target object on a user display on a user interface, and via the user interface, providing a user with an option to select a first and adjacent corner point of the target object in the initial image; and subsequently determining a line between the first and adjacent corner points, a length of said line indicating the first dimension;

subsequently determining only a second dimension of the target object, via the user interface, providing the user with an option to move an indicator on the user display away from the adjacent corner point and determining a perpendicular distance from a final position of the indicator selected by the user to a line passing through the first and adjacent corner point, said perpendicular distance comprising said second dimension;

subsequently providing a cropped and de-skewed final image of the target object responsive to the determined first and second dimension;

said step of determining the second dimension comprises determining h according to $$h = \frac{|a \times b|}{|a|} = \frac{x_2(y_1 - y_0) + y_2(x_1 - x_0) + x_0 y_1 - x_1 y_0}{\sqrt{(x_1 - x_0)^2 + (y_1 - y_0)^2}}$$

where $x_2$ is an x co-ordinate at the final position, $x_1$ is an x co-ordinate at a first corner point, $x_0$ is an x co-ordinate at an adjacent corner point, $y_2$ is a y co-ordinate at the final position, $y_1$ is a y co-ordinate at a first corner point and $y_0$ is a y co-ordinate at the adjacent corner point.

7. Apparatus for providing an image of a rectangular target object, comprising:
a user interface comprising a user display and at least one user response device for selecting a desired location on the user display;
a processor that determines only a first dimension of a rectangular target object in an initial image, subsequently determines only a second dimension of the target object, and subsequently displays a cropped and de-skewed final image of the target object on the user display responsive to the first and second dimension;
wherein the processor determines a first dimension of the target object by determining a distance between a first and adjacent corner point selected by a user and determines a second dimension of the target by determining a distance h where $$h = \frac{|a \times b|}{|a|} = \frac{x_2(y_1 - y_0) + y_2(x_1 - x_0) + x_0 y_1 - x_1 y_0}{\sqrt{(x_1 - x_0)^2 + (y_1 - y_0)^2}}$$

where $x_2$ is an x co-ordinate at the final position, $x_1$ is an x co-ordinate at a first corner point, $x_0$ is an x co-ordinate at an adjacent corner point, $y_2$ is a y co-ordinate at the final position, $y_1$ is a v co-ordinate at a first corner point and $y_0$ is a y co-ordinate at the adjacent corner point.

8. The apparatus as claimed in claim 7 wherein the processor determines a de-skew angle θ according to $$\theta = \tan^{-1}\left(\frac{\Delta y}{\Delta x}\right) = \tan^{-1}\left(\frac{y_1 - y_0}{x_1 - x_0}\right)$$

where $y_1$ is a y co-ordinate at the first corner point, $y_0$ is a y co-ordinate at an adjacent corner point, x1 is an x co-ordinate at the first corner point and $x_0$ is an x co-ordinate at the adjacent corner point.

* * * * *